United States Patent
Kim et al.

(10) Patent No.: US 9,630,629 B2
(45) Date of Patent: Apr. 25, 2017

(54) CONTROLLING A VEHICLE

(71) Applicant: LG ELECTRONICS INC., Seoul (KR)

(72) Inventors: Sungmin Kim, Seoul (KR); Byeongrim Jo, Seoul (KR); Juhnho Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/847,522

(22) Filed: Sep. 8, 2015

(65) Prior Publication Data

US 2016/0090098 A1   Mar. 31, 2016

(30) Foreign Application Priority Data

Sep. 25, 2014   (KR) .................. 10-2014-0128373

(51) Int. Cl.
*B60W 40/08*   (2012.01)
*B60W 10/30*   (2006.01)
(Continued)

(52) U.S. Cl.
CPC ............... *B60W 40/08* (2013.01); *B60Q 9/00* (2013.01); *B60W 10/30* (2013.01); *G01J 5/0025* (2013.01);
(Continued)

(58) Field of Classification Search
CPC .................. B60W 40/08; B60W 10/30; B60W 2040/0881; B60W 2420/40; G08B 21/22; G01J 5/0803; G01J 5/0025; B60Q 9/00
See application file for complete search history.

(56) References Cited

U.S. PATENT DOCUMENTS 5,148,410 A * 9/1992 Kuhn ..................... G01S 15/87
　　　　　　　　　　　　　　　　　　　367/96
6,762,676 B2 * 7/2004 Teowee ............... B60R 25/1004
　　　　　　　　　　　　　　　　　　　250/342
(Continued)

FOREIGN PATENT DOCUMENTS

JP   H 08-054281 A   2/1996
JP   2006-159939      6/2006
(Continued)

OTHER PUBLICATIONS

Korean Office Action dated Aug. 17, 2015, for Korean Application No. 10-2014-0128373, 7 pages.
(Continued)

*Primary Examiner* — Rodney Butler
(74) *Attorney, Agent, or Firm* — Fish & Richardson P.C.

(57) ABSTRACT

Systems and techniques are disclosed to provide a sensor unit configured to sense a living body within a vehicle and to control the vehicle according to the sensed data. A sensor unit is configured to sense infrared light emitted from one or more areas inside the vehicle. A blocking unit is located between the sensor unit and the one or more areas inside the vehicle. A controller is configured to control at least one of the blocking unit or the sensor unit so as to vary an amount of infrared light that the sensor unit is able to receive through the blocking unit from the one or more areas inside the vehicle. The controller determines, based on a variation in the amount of infrared light received by the sensor unit, whether or not a living body is present inside the vehicle.

19 Claims, 10 Drawing Sheets

(51) Int. Cl.
*G01J 5/00* (2006.01)
*G01J 5/08* (2006.01)
*B60Q 9/00* (2006.01)
*G08B 21/22* (2006.01)

(52) U.S. Cl.
CPC ............ *G01J 5/0803* (2013.01); *G08B 21/22* (2013.01); *B60W 2040/0881* (2013.01); *B60W 2420/40* (2013.01)

(56) References Cited

U.S. PATENT DOCUMENTS

| | | | | |
|---|---|---|---|---|
| 8,054,203 | B2* | 11/2011 | Breed | B60C 11/24 340/425.5 |
| 2003/0090371 | A1* | 5/2003 | Teowee | B60R 25/1004 340/426.24 |
| 2003/0102688 | A1 | 6/2003 | Bingle et al. | |
| 2008/0036580 | A1* | 2/2008 | Breed | B60R 21/01536 340/438 |
| 2008/0157985 | A1 | 7/2008 | Wilson | |
| 2009/0046538 | A1* | 2/2009 | Breed | B60C 11/24 367/93 |

FOREIGN PATENT DOCUMENTS

| | | |
|---|---|---|
| JP | 2006-337216 | 12/2006 |
| KR | 10-1999-025473 | 4/1999 |
| KR | 10-0180151 B1 | 4/1999 |
| KR | 10-2012-0067236 | 6/2012 |
| WO | 2007/105515 | 9/2007 |

OTHER PUBLICATIONS

Korean Notice of Allowance issued in Korean Application No. 10-2014-0128373 on Jan. 27, 2016, 2 pages.
Extended European Search Report issued in European Application No. 15002688.8 on Feb. 23, 2016, 7 pages.

* cited by examiner

CONTROLLING A VEHICLE

CROSS-REFERENCE TO RELATED APPLICATIONS

Pursuant to 35 U.S.C. §119(a), this application claims the benefit of an earlier filing date and right of priority to Korean Patent Application No. 10-2014-0128373, filed on Sep. 25, 2014 in the Korean Intellectual Property Office, the disclosure of which is incorporated herein by reference.

TECHNICAL FIELD

The present application relates to automated control of a vehicle.

BACKGROUND

Many vehicles provide functionality, comfort, and conveniences that encourage a variety of users to more heavily utilize those vehicles in different types of environments. Vehicles are commonly occupied by people of widely varying ages, from infants to the elderly, and with widely varying physical and mental conditions. Further, vehicles are often occupied by people in many different types of weather conditions for longer durations of time.

SUMMARY

Systems and techniques are disclosed herein that enable a vehicle to provide a sensor unit configured to sense a living body within the vehicle and to control the vehicle according to the sensed data. For example, such techniques may be used to reduce accidents related to the vehicle.

In one aspect, a vehicle includes a sensor unit configured to sense infrared light emitted from one or more areas inside the vehicle, and a blocking unit located between the sensor unit and the one or more areas inside the vehicle. The vehicle also includes a controller configured to control at least one of the blocking unit or the sensor unit so as to vary an amount of infrared light that the sensor unit is able to receive through the blocking unit from the one or more areas inside the vehicle. The controller determines, based on a variation in the amount of infrared light received by the sensor unit, whether or not a living body is present inside the vehicle.

In some implementations, the controller is further configured to control the at least one of the blocking unit or the sensor unit such that the sensor unit is unable to receive infrared light through the blocking unit from the one or more areas inside the vehicle during a first time period; and control the at least one of the blocking unit or the sensor unit such that the sensor unit is able to receive infrared light through the blocking unit from the one or more areas inside the vehicle during a second time period.

In some implementations, the controller is further configured to control the at least one of the blocking unit or the sensor unit such that the sensor unit is unable to receive infrared light through the blocking unit from a first area among the one or more areas inside the vehicle; and control the at least one of the blocking unit or the sensor unit such that the sensor unit is able receive infrared light through the blocking unit from a second area among the one or more areas inside the vehicle.

In some implementations, the blocking unit includes a transparent display having an adjustable transparency; and the controller is further configured to control the adjustable transparency of the transparent display of the blocking unit so as to vary an amount of infrared light that can pass through the blocking unit from the one or more areas inside the vehicle to the sensor unit.

In some implementations, the controller is further configured to control the adjustable transparency of the transparent display so that the sensor unit is unable to receive infrared light through the blocking unit from the one or more areas inside the vehicle; and control the adjustable transparency of the transparent unit so that the sensor unit is able to receive infrared light through the blocking unit from the one or more areas inside the vehicle.

In some implementations, the blocking unit includes a circular or semispherical structure having a hole; and a drive unit connected to the circular or semispherical structure and configured to provide the circular or semispherical structure with drive power. The controller is further configured to control the drive unit to set a position of the circular or semispherical structure so that the sensor unit is unable to receive infrared light through the blocking unit from the one or more areas inside the vehicle; and control the drive unit to set a position of the circular or semispherical structure so that the sensor unit is able to receive infrared light through the blocking unit from the one or more areas inside the vehicle.

In some implementations, the drive unit is configured to provide drive power for a rotation of the circular or semispherical structure. The controller is configured to control the drive unit so as to rotate the circular or semispherical structure.

In some implementations, the sensor unit includes a passive infrared ray (PIR) sensor.

In some implementations, the sensor unit includes a sensor configured to sense an amount of infrared light received through the blocking unit from the one or more areas inside the vehicle; and a sensor drive unit configured to provide the sensor with drive power. The controller is further configured to control the drive unit so as to cause a movement of the sensor that varies the amount of infrared light received by the sensor through the blocking unit from the one or more areas inside the vehicle.

In some implementations, the sensor drive unit is configured to provide drive power for a rotation of the sensor. The controller is configured to control the sensor drive unit so as to rotate the sensor.

In some implementations, the vehicle further includes a power supply unit configured to supply power to the sensor unit by converting sunlight into electric energy.

In some implementations, the vehicle further includes an air conditioner drive unit configured to control an air conditioner of the vehicle so as to supply conditioned air to an interior space of the vehicle; a window drive unit configured to control an opening and a closing of a window of the vehicle; and a door drive unit configured to control an opening and a closing of a door of the vehicle. The controller is further configured to determine whether or not a living body is present in the one or more areas inside the vehicle via the sensor unit; and control at least one of the air conditioner drive unit, the window drive unit, or the door drive unit based on a determination of whether or not a living body is present in the one or more areas inside the vehicle.

In some implementations, the vehicle further includes an alarm unit configured to output an acoustic signal. The controller is further configured to determine whether a living body is present in the one or more areas inside the vehicle via the sensor unit; and control the alarm unit based on a determination of whether a living body is present in the one or more areas inside the vehicle.

In some implementations, the vehicle further includes a communication unit configured to communicate with an external communication device. The controller is further configured to determine whether a living body is present in the one or more areas inside the vehicle via the sensor unit; and control the communication unit based on a determination of whether a living body is present in the one or more areas inside the vehicle.

In some implementations, the vehicle further includes a parking brake. The controller is further configured to determine that the parking brake is engaged; and control an operation of the at least one of the blocking unit or the sensor unit based a determination that the parking brake is engaged.

In some implementations, the vehicle further includes a temperature sensing unit configured to sense a temperature of an interior space of the vehicle. The controller is further configured to determine that the temperature sensed by the temperature sensing unit is greater than or equal to a critical value; and control an operation of the at least one of the blocking unit or the sensor unit based on a determination that the temperature sensed by the temperature sensing unit is greater than or equal to the critical value.

In some implementations, the vehicle further includes an oxygen amount sensing unit configured to sense an amount of oxygen in an interior space of the vehicle. The controller is further configured to determine that an amount of oxygen sensed by the oxygen amount sensing unit is less than or equal to a critical value; and control an operation of the at least one of the blocking unit or the sensor unit based on a determination that the amount of oxygen sensed by the oxygen amount sensing unit is less than or equal to the critical value.

In some implementations, the vehicle further includes an optical sensor configured to sense sunlight. The controller is further configured to determine that a quantity of sunlight sensed by the optical sensor is greater than or equal to a critical value; and control an operation of the at least one of the blocking unit or the sensor unit based on a determination that the quantity of sunlight sensed by the optical sensor is greater than or equal to the critical value.

In some implementations, the vehicle further includes a starter unit. The controller is further configured to determine a time at which the starter unit has turned off; determine that at least a predetermined period of time has elapsed after the time at which the starter unit is determined to have turned off; and control an operation of the at least one of the blocking unit or the sensor unit based on a determination that at least the predetermined period of time has elapsed after the time at which the starter unit is determined to have turned off.

In some implementations, the controller is configured to determine a first amount of infrared light received by the sensor unit based on controlling the at least one of the blocking unit or the sensor unit so that the sensor unit is unable to receive infrared light through the blocking unit from the one or more areas inside the vehicle; determine a second amount of infrared light received by the sensor unit based on controlling the at least one of the blocking unit or the sensor unit so that the sensor unit is able to receive infrared light through the blocking unit from the one or more areas inside the vehicle; compare the first amount of infrared light with the second amount of infrared light; determine that a difference between the first amount of infrared light and the second amount of infrared light exceeds a threshold; and determine, based on a determination that the difference between the first amount of infrared light and the second amount of infrared light exceeds the threshold, that a living body is present inside the vehicle.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

Techniques and systems are disclosed that enable a vehicle to provide a sensor unit configured to sense a living body within the vehicle and to control the vehicle according to the sensed data. Such techniques may, for example, be used to reduce the risk of passengers suffering discomfort or harm within the vehicle during extreme environmental conditions within the vehicle.

Such techniques may be used for various reasons. For example, such techniques may reduce the risk of suffocation and/or frostbite within a vehicle. Such accidents may occur as a passenger suffocates when staying in a vehicle for a long time in a state where the sealed vehicle is at a standstill. For example, fatal accidents may occur when a passenger is asleep in a state where all doors and windows of a vehicle are closed and an air conditioner is turned on, or is asleep in a state where all doors and windows of a vehicle are closed in the middle of summer or in the middle of winter.

In some vehicles, one or more sensors, such as infrared sensors, may be used to sense a human body. As an example, a passive infrared ray (PIR) sensor, which is relatively low cost, may be used to sense as a human body. The PIR sensor may be used, for example, in an automatic door, a luminaire, an alarm, and/or an air conditioner. However, a PIR sensor may be limited to only movement of the human body and may not sense the presence or absence of a stationary human body.

A vehicle as described in this specification may include a car. Hereinafter, a description will be given based on a car, but implementations are not necessarily limited thereto, and may generally include any suitable vehicle that transports people. In some implementations, a car may include, for example, an internal combustion engine car, a hybrid car, an electric car, and a hydrogen fuel car. Although this specification describes on an internal combustion engine car, implementations may also include cars having other driving mechanisms and are within the scope of the present disclosure.

Figure 1:
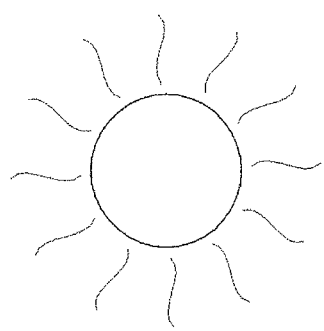
FIG. 1 is a diagram illustrating an example of a vehicle.
Figure 1:
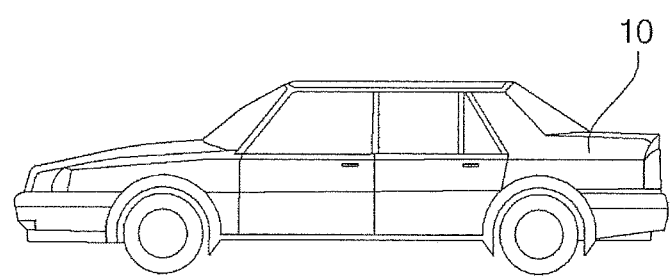

FIG. 1 is a diagram illustrating an example of a vehicle.

Referring to the example of FIG. 1, the interior temperature of a vehicle 10 in the middle of summer may exceed 50 degrees Celsius in just a few minutes. When a baby is in the vehicle 10 without parents, there is a risk of the baby suffocating within a few minutes because the body temperature of a baby more rapidly rises than that of an adult.

Even in the case where it is not the middle of summer, a suffocation accident of a passenger who falls asleep in the vehicle 10 in a state where windows and doors of the vehicle 10 are closed occurs frequently.

To prevent these accidents, it is necessary to sense the presence of the human body in the vehicle 10 such that, in response to sensing the human body, an air conditioner of the vehicle 10 is operated, windows or doors of the vehicle 10 are opened, an alarm of the vehicle 10 is raised, or emergency communication between the vehicle 10 and a management center is implemented.

Here, a passive infrared ray (PIR) sensor to sense infrared light emitted from the human body may be worth consideration as a means capable of sensing the human body. However, the PIR sensor is not operated when there is no movement of the human body. For example, when a passenger is asleep within the vehicle 10, no movement is sensed and the PIR may not be operated.

In addition, for operation of the PIR sensor, an appropriate amount of power needs to be supplied to the PIR sensor. In most cases where a passenger is asleep in the vehicle 10, however, the engine of the vehicle 10 is turned off and, therefore, the supply of power to the PIR sensor may be problematic.

Figure 2:
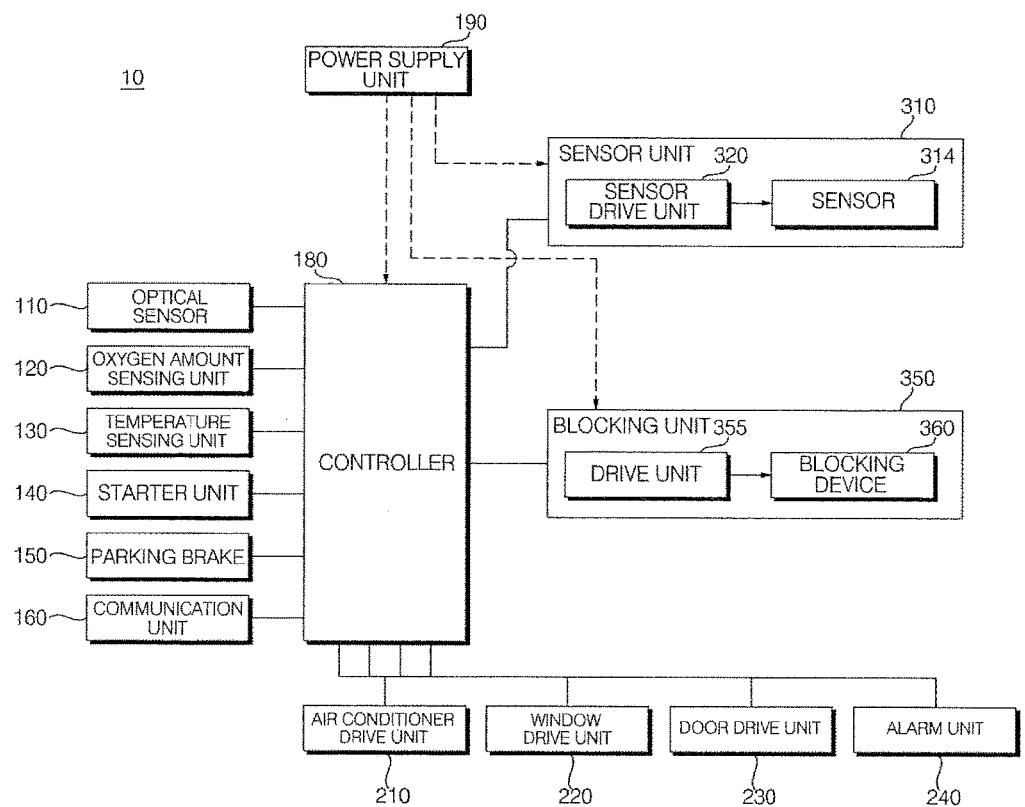
FIG. 2 is a block diagram illustrating an example of a vehicle.

FIG. 2 is a block diagram illustrating an example of a vehicle according to some implementations.

Referring to the example of FIG. 2, the vehicle 10 may include an optical sensor 110, an oxygen amount sensing unit 120, a temperature sensing unit 130, a starter unit 140, a parking brake 150, a communication unit 160, a power supply unit 190, an air conditioner drive unit 210, a window drive unit 220, a door drive unit 230, an alarm unit 240, a sensor unit 310, a blocking unit 350, and a controller 180.

The optical sensor 110 serves to sense sunlight. The optical sensor 110 may sense sunlight by converting optical energy introduced to the optical sensor 110 into an electric signal. For example, the optical sensor 110 may absorb optical energy and sense sunlight using photoelectric effects that refer to discharge of electrons caused by absorption of optical energy. The photoelectric effects used in the optical sensor 110 may be classified into a photoelectromotive effect, a photoconductive effect, a photon discharge effect, and a pyroelectric effect. Elements using the photoelectromotive effect include a photodiode, a solar cell, and a photo IC. Elements using the photoconductive effect include Cds and CdSe. Elements using the photon discharge effect include a photon and a photomultiplier. Elements using the pyroelectric effect include a PZT cell and a $LiTaO_3$ cell. The optical sensor 110 senses sunlight using at least one of the aforementioned elements. Upon receiving the electric signal from the optical sensor 110, the controller 180 may calculate the quantity of light based on the electric signal converted from the sensed sunlight. In addition, the controller 180 may predict how much does the temperature of an indoor space in the vehicle 10 increase based on the quantity of light.

The oxygen amount sensing unit 120 serves to sense the amount of oxygen in the indoor space of the vehicle 10. The oxygen amount sensing unit 120 may include at least one of a zirconia oxygen sensor, a titania oxygen sensor, and a wide area sensor. The oxygen amount sensing unit 120 may sense the amount of oxygen using the magnitude of electromotive force depending on the ion conduction degree of oxygen molecules. The controller 180 may calculate the amount of oxygen in the indoor space of the vehicle 10 based on an electric signal received from the oxygen amount sensing unit 120, the electric signal being converted from the amount of oxygen sensed by the oxygen amount sensing unit 120.

The temperature sensing unit 130 may sense the temperature using any one of a thermal expansion method, a thermal electromotive method, an electric resistance method, a semiconductor method, a magnetic method, an elastic method, a radiation method, a hot wire method, and a photoelectric method. For example, the sensing unit 310 may include a negative temperature coefficient (NTC) thermistor and sense the temperature using resistance variation depending on temperature variation. The controller 180 may calculate the temperature of the indoor space in the vehicle 10 based on an electric signal depending on variation in temperature received from the temperature sensing unit 130.

The starter unit 140 may transmit a state signal such as an ON signal or an OFF signal of the vehicle 10 to the controller 180.

The parking brake 150 may transmit a state signal such as an ON signal or an OFF signal of the parking brake 150 to the controller 180.

The communication unit 160 may exchange information or data in a wireless manner with a mobile terminal (not illustrated) or a server (not illustrated). The communication unit 160 may receive weather information and road traffic situation information such as, for example, transport protocol expert group (TPEC) information from the mobile terminal (not illustrated) or the server (not illustrated). The communication unit 160 may transmit an emergency signal to the mobile terminal (not illustrated) or the server (not illustrated) under control of the controller 180 when a passenger located in the indoor space of the vehicle 10 is in a dangerous situation. Here, the mobile terminal (not illustrated) or the server (not illustrated) may be predetermined as the other party of emergency signal transmission in an emergency situation. At this time, the mobile terminal (not illustrated) or the server (not illustrated) may be an external communication device.

The power supply unit 190 serves to receive external power or internal power and to supply power required to operate the respective units under control of the controller 180. The power supply unit 190 includes a battery.

The power supply unit 190 may further include a solar cell (not illustrated) having a pn junction structure. The solar cell (not illustrated) converts light energy received from the sun into electric energy. When external photons are absorbed into the solar cell (not illustrated), pairs of electrons and holes are generated in the solar cell (not illustrated) by energy of the photons. In the generated electron-hole pairs, the electrons move to an n-type semiconductor by an electric field generated at a pn junction and the holes move to a p-type semiconductor and are collected by electrodes located at respective surfaces. Charges collected at the respective electrodes may become an energy source to operate a load as current flowing through the load when the load is connected to an external circuit.

The power supply unit 190 may further include a storage unit (not illustrated) to store the electric energy generated in the solar cell (not illustrated).

The air conditioner drive unit 210 may perform electronic control on an air conditioner (not illustrated) equipped in the vehicle 10. For example, the air conditioner drive unit 210 may control supply of cold air into the vehicle 10 by operating the air conditioner (not illustrated) when the interior temperature of the vehicle 10 is high under control of the controller 180. Here, the air conditioner (not illustrated) is a device that supplies conditioned air to the indoor space of the vehicle 10. The air conditioner (not illustrated) functions as a cooler or heater. The cooler may perform a cooling or dehumidification function on the indoor space via heat exchange through a process of compression-condensation-expansion-evaporation. The heater may systematically control heat through a process of cooling water heated by heat generated from an engine being circulated to the heater, thereby supplying the heat to the indoor space of the vehicle 10.

The window drive unit 220 may perform electronic control on windows of the vehicle 10. For example, the window drive unit 220 may control opening or closing of the windows located at the right side or the left side of the vehicle 10 under control of the controller 180.

The door drive unit 230 may perform electronic control on doors of the vehicle 10. For example, the door drive unit 230 may control opening or closing of the doors located at the right side or the left side of the vehicle 10 under control of the controller 180.

The alarm unit 240 may include a sound output unit to output an acoustic signal through the sound output unit. For example, the alarm unit 240 may output an alarm sound to a passenger who is located in the vehicle 10 or to the outside of the vehicle 10. For example, the alarm unit 240 may output an alarm sound that can be recognized by a person under control of the controller 180.

The sensor unit 310 serves to sense infrared light emitted from the human body. The sensor unit 310 is connected to the controller 180 and transmits an electric signal indicating whether or not the human body is sensed to the controller 180.

Generally, all objects having higher temperatures than absolute zero temperature (−273° C.) emit radiation corresponding to the temperature thereof and some of the objects having a lower temperature such as the body temperature emit far infrared light.

Objects having a high temperature radiate a greater amount of infrared light than objects having a low temperature and the peak value of radiation energy becomes close to a short wavelength side, e.g., a visible light region as temperature increases.

The surface temperature of the human body may vary according to clothes or surrounding temperatures and is generally within a range of about 20° C. to 35° C. The wavelength distribution of emitted infrared light generally has a peak value at or near about 10 micrometers. Using the sensor unit 310, the system may determine whether or not a living (e.g., human) body is present by sensing variation in the amount of infrared light received.

For example, by detecting a variation in the amount of infrared light received, the system may be able to distinguish between the presence or absence of a living body and/or may be able to determine a movement of a living body in the vehicle. In some implementations, the sensor unit 310 may include a PIR sensor. An operation for sensing variation in the amount of infrared light from the human body by the sensor unit 310 will be described below with reference to FIGS. 4A and 4B.

In some implementations, the sensor unit 310 may include a sensor drive unit 320 and a sensor 314.

The sensor drive unit 320 provides drive power to the sensor 314. At this time, the drive power may be drive power for rotation. The sensor 314 may be moved by drive power transmitted from the sensor drive unit 320. For example, the sensor drive unit 320 may include a motor and a drive power transmitter. The motor generates drive power. The drive power transmitter transmits the drive power generated by the motor to the sensor 314. The sensor 314 may be moved by the transmitted drive power.

The sensor 314 senses infrared light emitted from the human body. The sensor 314 may be a PIR sensor as described above. For example, the sensor 314 may sense infrared light emitted from the human body using a pyroelectric effect.

The sensor unit 310 may include a housing (not illustrated) defining the external appearance of the sensor unit 310.

The blocking unit 350 is located between the human body and the sensor unit 310. The blocking unit 350 is configured to vary the introduction amount of infrared light from the human body to the sensor unit 310. For example, the blocking unit 350 may block infrared light emitted from the human body to prevent the infrared light from reaching the sensor unit 310.

In some implementations, the blocking unit 350 may include a drive unit 355 and a blocking device 360.

For example, the blocking device 360 may include a transparent display having adjustable transparency. At this time, the drive unit 355 may adjust transparency of the transparent display in response to a control instruction of the controller 180.

For example, the blocking device 360 may be a circular or semispherical structure. The circular or semispherical structure may include at least one hole. Infrared light emitted from the human body may reach the sensor unit 310 through the hole. At this time, the drive unit 355 may provide the blocking device 360 with drive power in response to a control instruction of the controller 180. At this time, the drive power may be drive power for rotation. The circular or semispherical structure may be moved by the drive power transmitted from the drive unit 355. For example, the drive unit 355 may include a motor and a drive power transmitter. The motor generates drive power. The drive power transmitter transmits the drive power generated by the motor to the circular or semispherical structure. The circular or semispherical structure may be moved by the transmitted drive power.

The blocking unit 350 may include a housing (not illustrated) defining the external appearance of the blocking unit 350.

The controller 180 may transmit a control signal to the sensor unit 310 when traveling of the vehicle 10 ends, or may transmit a control signal to the sensor unit 310 after a predetermined time has passed from the end of traveling of the vehicle 10. The predetermined time may be set according to, for example, the thermal isolation performance of a vehicle and the climate condition of a vehicle use area. For example, the predetermined time may be set to 0 to 10 minutes. Here, upon receiving an ON signal of the parking brake 150, the controller 180 may determine that traveling of the vehicle 10 has ended. Alternatively, upon receiving an OFF signal from the starter unit 140, the controller 180 may determine that traveling of the vehicle 10 has ended. Alternatively, when a given time has passed in the stop state of the vehicle 10, the controller 180 may determine that traveling of the vehicle 10 has ended. Alternatively, the controller 180 may determine that traveling of the vehicle 10 has ended when a transmission mode is a parking mode.

The controller 180 may divide a time during which the human body is located in the indoor space of the vehicle 10, or may divide the indoor space of the vehicle 10. The controller 180 may control the blocking unit 350 or the sensor unit 310 so as to block or not block infrared light to be introduced to the sensor unit 310 on a per divided time basis or on a per divided indoor space basis. Here, the infrared light may be infrared light emitted from the human body that is located in the indoor space of the vehicle 10. The controller 180 may determine whether or not the human body is present based on variation in the amount of infrared light introduced to the sensor unit 310 depending on the lapse of time.

For example, the controller 180 may divide a time into a first time and a second time. When the first time has passed, the controller 180 may block infrared light to be introduced to the sensor unit 310 by controlling the blocking unit 350 or the sensor unit 310. When the second time has passed, the controller 180 may not block infrared light to be introduced to the sensor unit 310 by controlling the blocking unit 350 or the sensor unit 310.

For example, the controller 180 may divide the indoor space of the vehicle 10 into a first region and a second region. The controller 180 may block infrared light introduced from the first region and may not block infrared light introduced from the second region by controlling the blocking unit 350 or the sensor unit 310 in the same time slot.

The controller 180 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, micro-processors, and other electric units for implementation of other functions.

In the case where the blocking unit 350 includes the transparent display having adjustable transparency, the controller 180 may control the transparency of the transparent display via control of the drive unit 355, so as to vary the introduction amount of infrared light to the sensor unit 310. For example, when the transparent display is divided into a plurality of regions and the transparencies of the respective regions are controllable, the controller 180 may sequentially control the transparencies of the respective regions so as to block or not block infrared light.

In the case where the blocking unit 350 includes a circular or semispherical structure having a hole, the controller 180 may control movement of the structure via control of the drive unit 355 that applies drive power to the structure, so as to block or not block infrared light. For example, when the drive unit 355 provides drive power for rotation, the controller 180 may control the drive unit 355 to rotate the structure, so as to block or not infrared light. For example, when the circular or semispherical structure having the hole is rotated, the hole will pass infrared light and a remaining region except for the hole will block infrared light.

In the case where the blocking unit 350 includes the circular or semispherical structure having the hole, the controller 180 may control movement of the sensor 314 via control of the sensor drive unit 320 that provides the sensor 314 with drive power, so as to block or not block infrared light. For example, when the sensor drive unit 320 supplies drive power for rotation, the controller 180 may control the sensor drive unit 320 to rotate the sensor 314, so as to block or not block infrared light.

An operation for controlling variation in the introduction amount of infrared light to the sensor unit 310 through control of the sensor unit 310 or the blocking unit 350 will be described below in detail with reference to FIGS. 6 to 9.

As described above, the controller 180 may control variation in the introduction amount of infrared light to the sensor unit 310 via control of the sensor unit 310 or the blocking unit 350. When the human body is located in the indoor space of the vehicle 10, the sensor unit 310 may sense variation in the amount of infrared light emitted from the human body and the controller 180 may determine that the human body is present in the indoor space of the vehicle 10.

As an example, in some implementations, the controller may determine a first amount of infrared light received by the sensor unit when the sensor unit is unable to receive infrared light through the blocking unit, and determine a second amount of infrared light received by the sensor unit when the sensor unit is able to receive infrared light through the blocking unit. The controller may compare the first amount of infrared light with the second amount of infrared light, and determine whether the difference between exceeds a threshold. If the difference exceeds the threshold, then this may indicate that infrared light is being emitted by a living body inside the vehicle, and is being received by the sensor unit through the blocking unit.

Upon determining that the human body is present, the controller 180 controls the air conditioner drive unit 210 so as to supply conditioned air to the indoor space of the vehicle 10. For example, upon determining that the human body is present, the controller 180 may lower the temperature of the indoor space of the vehicle 10 by supplying cold air to the indoor space of the vehicle 10.

Upon determining that the human body is present, the controller 180 controls the window drive unit 220 so as to open windows of the vehicle 10. For example, the controller 180 may allow outside air to be introduced to the indoor space of the vehicle 10 via opening of the windows.

Upon determining that the human body is present, the controller 180 controls the door drive unit 230 so as to open doors of the vehicle 10. For example, the controller 180 may allow outside air to be introduced to the indoor space of the vehicle 10 via opening of the doors. In addition, the controller 180 may control removal of any obstacle that prevents a person from entering the indoor space of the vehicle 10 by opening the door.

Upon determining that the human body is present, the controller 180 may control the alarm unit 240 so as to output an acoustic signal. For example, the controller 180 may warn of a dangerous situation inside or outside the vehicle 10 via output of a sound from the alarm unit 240.

Upon determining that the human body is present, the controller 180 may control the communication unit 160 so as to transmit a signal to an external communication device. For example, the controller 180 may notify the external communication device a dangerous situation via signal transmission. Here, the communication device may be a predetermined mobile terminal or server.

Figure 3:
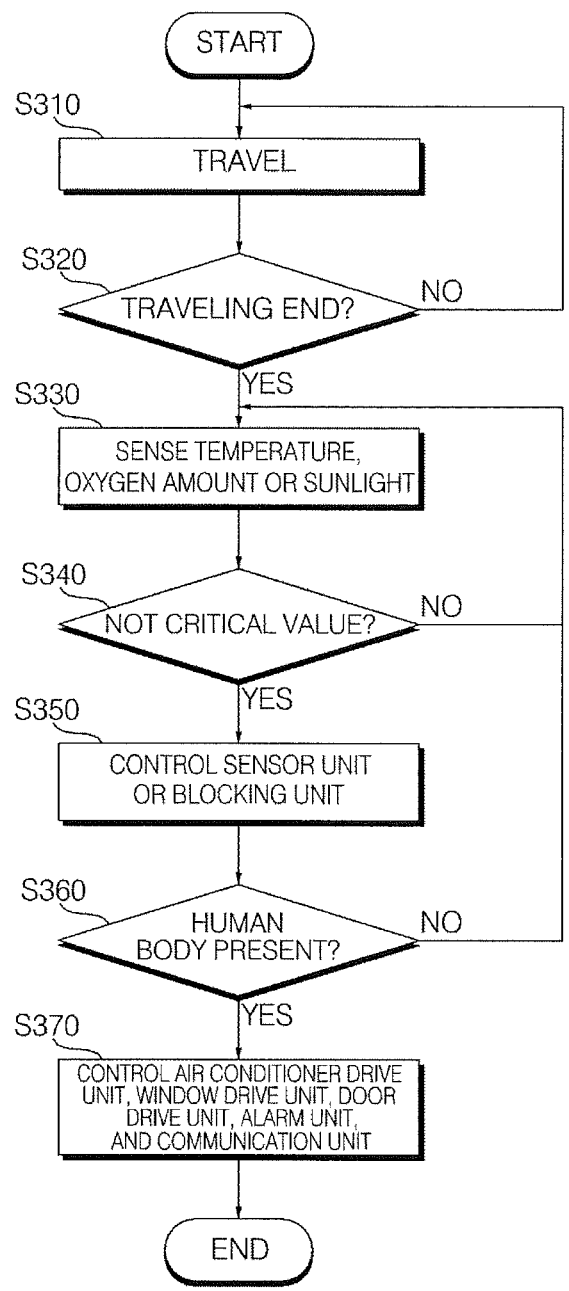
FIG. 3 is a flowchart illustrating an example of an operation of a vehicle.

FIG. 3 is a flowchart of an example of an operation of a vehicle according to some implementations.

Referring to the example of FIG. 3, after completion of traveling of the vehicle 10, the controller 180 determines whether or not traveling ends (S310 and S320). Here, the controller 180 may determine that traveling of the vehicle 10 has ended upon receiving an ON signal of the parking brake 150. Alternatively, the controller 180 may determine that traveling of the vehicle 10 has ended upon receiving an OFF signal from the starter unit 140.

When traveling ends, the controller 180 senses the temperature, the amount of oxygen, or sunlight (S330).

The temperature sensing unit 130 senses the temperature of the indoor space of the vehicle 10. The controller 180 calculates the temperature of the indoor space of the vehicle 10 based on an electric signal depending on variation in temperature received from the temperature sensing unit 130.

The oxygen amount sensing unit 120 senses the amount of oxygen in the indoor space of the vehicle 10. The controller 180 calculates the amount of oxygen in the indoor space of the vehicle 10 based on an electric signal depending on variation in the amount of oxygen received from the oxygen amount sensing unit 120.

The optical sensor 110 senses sunlight directed to the vehicle 10. The controller 180 calculates the quantity of light based on an electric signal converted from the sensed sunlight and predicts how much does the temperature in the indoor space of the vehicle 10 increase based on the quantity of light.

The controller 180 determines whether or not the sensed temperature, the sensed amount of oxygen, or the sensed quantity of sunlight deviates from a critical value (S340). For example, the controller 180 determines whether or not the sensed indoor temperature of the vehicle 10 is a predetermined value or more. For example, the controller 180 determines whether or not the sensed amount of oxygen in the indoor space of the vehicle 10 is a predetermined value or less. For example, the controller 180 determines whether or not the sensed quantity of sunlight is a predetermined value or more.

Upon determining that the sensed temperature, the sensed amount of light, or the sensed quantity of sunlight deviates from the critical value, the controller 180 controls the sensor unit 310 or the blocking unit 350. The controller 180 controls variation in the introduction amount of infrared light to the sensor unit 310 via control of the sensor unit 310 or the blocking unit 350.

Upon determining that the human body is present in the indoor space of the vehicle 10 based on variation in the amount of infrared light (S360), the controller 180 controls the air conditioner drive unit 210, the window drive unit 220, the door drive unit 230, the alarm unit 240, and the communication unit 160 (S370).

Upon determining that the human body is present, the controller 180 may control the air conditioner drive unit 210 so as to supply conditioned air to the indoor space of the vehicle 10.

Upon determining that the human body is present, the controller 180 may control the window drive unit 220 so as to open windows of the vehicle 10.

Upon determining that the human body is present, the controller 180 may control the door drive unit 230 so as to open doors of the vehicle 10.

Upon determining that the human body is present, the controller 180 may control the alarm unit 240 so as to output an acoustic signal.

Upon determining that the human body is present, the controller 180 may control the communication unit 160 so as to transmit a signal to an external communication device.

Figure 4A:
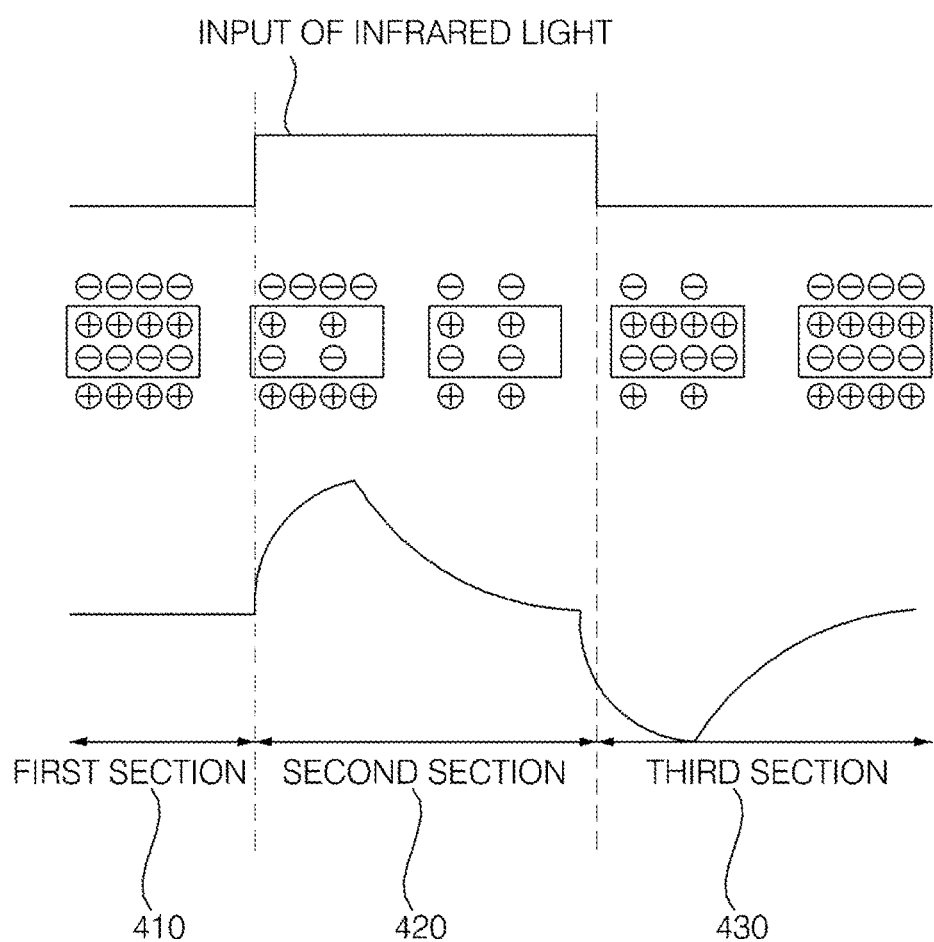
FIGS. 4A and 4B are diagrams illustrating examples of a sensor unit.

FIGS. 4A(a), 4A(b), 4A(c), and 4B are diagrams illustrating an example of a sensor unit according to some implementations.

FIGS. 4A(a), 4A(b), 4A(c), and 4B illustrate examples of an operation of the sensor unit 310 for sensing infrared light emitted from the human body.

FIG. 4A(a) illustrates the input of infrared light in a signal form, FIG. 4A(b) illustrates variation in the surface charge of a pyroelectric element depending on input of infrared light, and FIG. 4A(c) illustrates an electrical output depending on variation in the surface charge of the pyroelectric element.

The sensor unit 310, as described above, may include the sensor drive unit 320 and the sensor 314. The sensor 314 may include a pyroelectric element. Here, the pyroelectric element may mainly use a PZT(lead zirconate titanate)-based and $LiTaO_3$(lithium tantalate)-based element.

For a first period 410, the pyroelectric element is spontaneously polarized and is always charged at the surface thereof. However, the pyroelectric element provides no electric output via neutralization with ions in air in a thermal balance state.

For a second period 420 or a third section 430, when the introduction amount of infrared light to the pyroelectric element varies, e.g., when infrared light begins to be introduced to the pyroelectric element or infrared light is no longer introduced, slight temperature variation occurs near the surface of the pyroelectric element and the thermal balance state is broken (pyroelectric effect). In this case, as unbalanced charges induce voltage variation, the sensor unit 310 may sense variation in the amount of infrared light.

Since the sensor unit 310 provides an electric output only when the amount of infrared light varies such as, for example, when infrared light begins to be introduced or when infrared light is no longer introduced, as exemplarily illustrated in FIG. 4A(c), an differential waveform output is generated.

For this reason, the sensor 310 may not sense the human body that is stationary and may sense only the human body that moves.

Figure 4B:
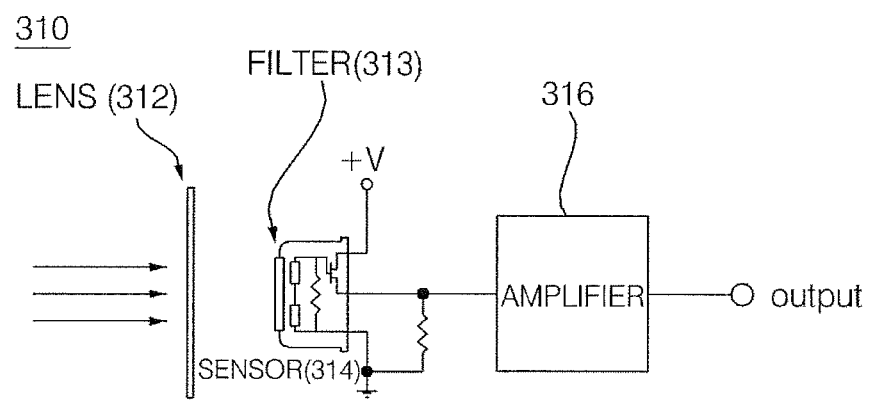

FIG. 4B is a diagram illustrating an example of a configuration of a sensor unit (e.g., the sensor unit 310) according to some implementations.

Referring to the example of FIG. 4B, the sensor unit 310 may include a lens 312, a filter 313, a sensor 314, and an amplifier 316.

The lens 312 serves to adjust a sensing area of the sensor 314. The lens 312 may include a multi-mirror as a combination of several mirror segments or lens segments, a multi-Fresnel lens, or a dome-shaped lens.

The filter 313 may separate only infrared light from an introduced wavelength so as to pass the infrared light.

The sensor 314 senses variation in the amount of infrared light. The sensor 314 may be a PIR sensor and include a pyroelectric element as described above.

The amplifier 316 amplifies an electric signal output from the sensor 314. The amplifier 316 includes at least one element for signal amplification. The amplifier 316 may transmit an amplified signal to the controller 180.

Figure 5:
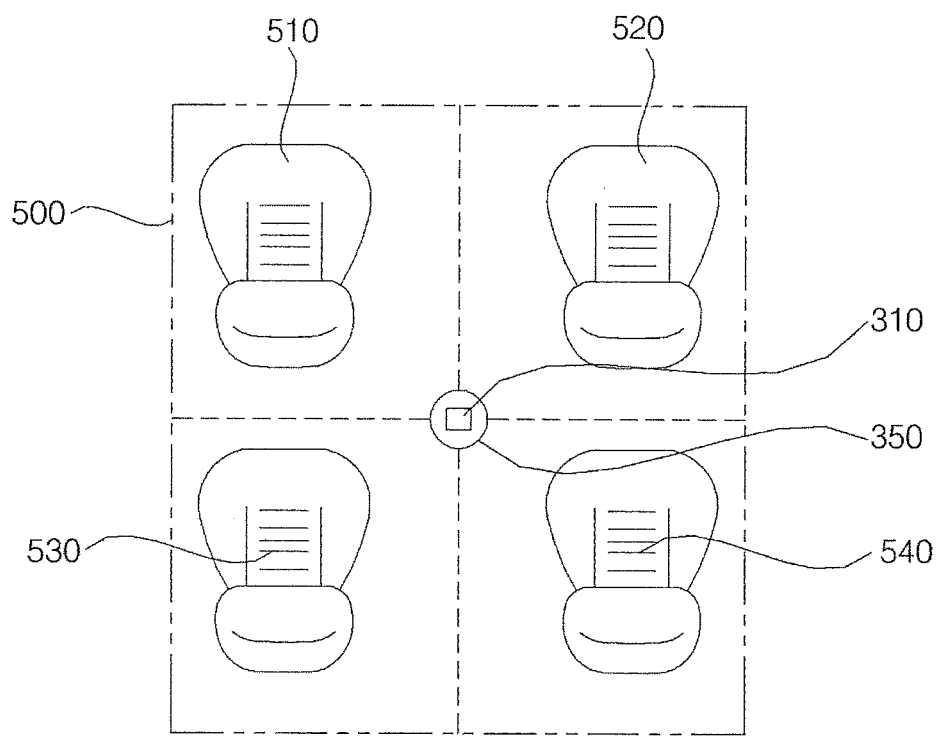
FIG. 5 is a diagram illustrating an example of a sensor unit and a blocking unit arranged in a vehicle.

FIG. 5 is a diagram illustrating an example of a sensor unit and a blocking unit arranged in a vehicle according to some implementations.

Referring to the example of FIG. 5, an indoor space 500 of the vehicle 10 may be divided into a plurality of areas. For example, the indoor space 500 may include a left front seat area 510, a right front seat area 520, a left rear seat area 530 and a right rear seat area 540. The human body may be located in each of the areas 510, 520, 530 and 540.

The sensor unit 310 may sense the human body that is located in one area of the indoor space 500 of the vehicle 10. For example, the sensing areas of the sensor unit 310 may include the left front seat area 510, the right front seat area 520, the left rear seat area 530 and the right rear seat area 540. In some implementations, the sensor 314 included in the sensor unit 310 may sense all of the areas of the indoor space 500 while being rotated upon receiving drive power from the sensor drive unit 320. At this time, the blocking unit 350 may be fixed. For example, when the stationary human body is located in the indoor space 500, the sensor unit 310 may allow an artificially varied amount of infrared light to be introduced to the sensor unit 310 via movement of the sensor unit 310.

The sensor unit 310 may be located at the center of the ceiling of the indoor space 500. In some implementations, the sensor unit 310 may be connected to a dome light (not illustrated) of the vehicle 10. The sensor unit 310 may receive power from a power supply source of the dome light (not illustrated). For example, the sensor unit 310 may receive power even in a state where the vehicle 10 does not travel.

The blocking unit 350 is located between the human body and the sensor unit 310. Specifically, the blocking unit 350 may be located close to the sensor unit 310 with a predetermined distance from the sensor unit 310. The blocking unit 350 may vary the introduction amount of infrared light from the human body to the sensor unit 310. In some implementations, the blocking device 360 included in the blocking unit 350 may block or not block introduction of infrared light to the sensor unit 310 via control of the drive unit 355. For example, when the stationary human body is located in the indoor space 500, the blocking unit 350 may be operated to block or not block the sensor unit 310 so as to allow an artificially varied amount of infrared light to be introduced to the sensor unit 310.

Figure 6:
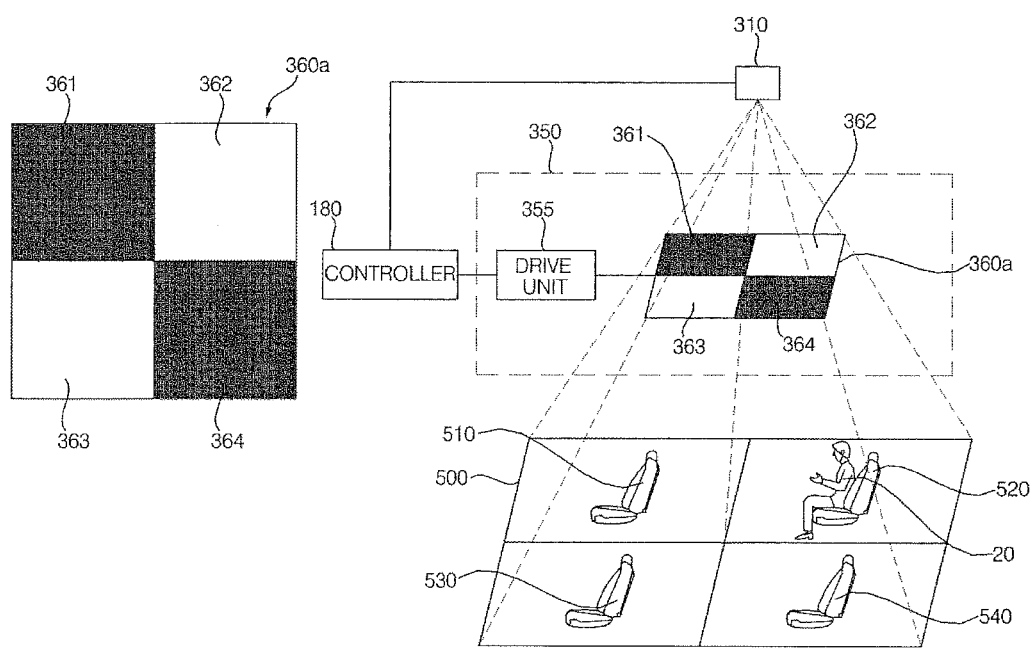
FIG. 6 is a diagram illustrating an example of a blocking unit of a vehicle that includes a transparent display.

FIG. 6 is a diagram illustrating an example of a blocking unit of a vehicle that includes a transparent display according to some implementations.

As illustrated in the example of FIG. 6, the blocking unit 350 may include a transparent display 360a. The transparent display 360a may include at least one of a projection type transparent display, a transparent thin film electroluminescent (TFEL) display, a transparent organic light emitting diode (OLED) display, a transparent liquid crystal display (LCD), a transmissive transparent display, and a transparent light emitting diode (LED) display.

The transparent display 360a may include a plurality of regions 361, 362, 363 and 364. The respective regions 361, 362, 363 and 364 may be adjusted in transparency under control of the drive unit 355. For example, the transparency of the first region 361 may be adjusted to prevent passage of infrared light, and transparencies of the second to fourth regions 362, 363 and 364 may be adjusted to allow passage of infrared light. The transparencies of the first region to the fourth region 361, 362, 363 and 364 may be sequentially adjusted as needed.

As exemplarily illustrated in FIG. 6, the controller 180 controls the drive unit 355. The drive unit 355 adjusts the transparency of the transparent display 360a under control of the controller 180.

For example, the indoor space 500 of the vehicle 10 may be divided into an A area 510, a B area 520, a C area 530, and a D area 540. The transparent display 360a may be divided into the first region 361, the second region 362, the third region 363 and the fourth region 364. Virtual lines that connect respective corners of the transparent display 360a to the sensor unit 310 may meet respective corners of the indoor space 500. In addition, a virtual line that connects the center of the transparent display 360a to the sensor unit 310 may meet the center of the indoor space 500. In addition, the regions 361, 362, 363 and 364 of the transparent display 360a may be separated from one another by, for example, partitions (not illustrated) such that infrared light emitted from the human body located in each of the A area 510, the B area 520, the C area 530 and the D area 540 of the indoor space 500 of the vehicle 10 is introduced to the sensor unit 310 through a corresponding one of the regions 361, 362, 363 and 364 of the transparent display 360a.

When the transparency of the first region 361 of the transparent display 360a is adjusted to prevent passage of infrared light, infrared light emitted from the human body located in the A area 510 is blocked by the first region 361 and may not reach the sensor unit 310. When the transparency of the second region 362 is adjusted to prevent passage of infrared light, infrared light emitted from the human body located in the B area 520 is blocked by the second region 362 and may not reach the sensor unit 310. When the transparency of the third region 363 is adjusted to prevent passage of infrared light, infrared light emitted from the human body located in the C area 530 is blocked by the third region 363 and may not reach the sensor unit 310. When the transparency of the fourth region 364 is adjusted to prevent passage of infrared light, infrared light emitted from the human body located in the D area 540 is blocked by the fourth region 364 and may not reach the sensor unit 310.

It is assumed that a human body 20 that is stationary is located in the B area 520 of the indoor space 500. At this time, the drive unit 355 individually adjusts the transparencies of the respective regions 361, 362, 363 and 364 of the transparent display 360a under control of the controller 180. In this case, infrared light emitted from the human body 20 may reach or not reach the sensor unit 310 on a per time basis. For example, when the transparency of the second region 362 is adjusted to allow passage of infrared light, infrared light may reach the sensor unit 310. On the other hand, when the transparency of the second region 362 is adjusted to prevent passage of infrared light, infrared light may not reach the sensor unit 310.

In this way, as the introduction amount of infrared light varies, the sensor unit 310 senses variation in the amount of infrared light and generates an electric signal. The controller 180 may determine that the human body 20 is present in the indoor space 500 upon receiving the electric signal generated by the sensor unit 310.

In an alternative implementation of the above-described implementation, the transparent display 360a, which is integrated rather than being divided into a plurality of regions, may be used as the blocking unit 350. The transparent display 360a may be adjusted in transparency under control of the drive unit 355. For example, the transparency of the transparent display 360a may be gradually reduced or increased under control of the drive unit 355. For example, the transparency of the transparent display 360a may be adjusted to allow passage of infrared light or to prevent passage of infrared light.

The controller 180 may control the drive unit 355 such that the transparency of the transparent display 360a varies according to the lapse of time. For example, the controller 180 may control the drive unit 355 to adjust the transparency of the transparent display 360a such that the transparency of the transparent display 360a gradually varies according to the lapse of time, or such that the transparent display 360a alternately passes infrared light.

When the transparency of the transparent display 360a is adjusted to prevent passage of infrared light, infrared light emitted from the human body that is located in the indoor space 500 of the vehicle 10 may be blocked by the transparent display 360a and may not reach the sensor unit 310. When the transparency of the transparent display 360a is adjusted to allow passage of infrared light, infrared light emitted from the human body that is located in the indoor space 500 of the vehicle 10 may reach the sensor unit 310.

It is assumed that the stationary human body 20 is located in the indoor space 500. At this time, the drive unit 355 adjusts the transparency of the transparent display 360a to allow infrared light to alternately pass the transparent display 360a under control of the controller 180. In this case, infrared light emitted from the human body 20 may reach or not reach the sensor unit 310 on a per time basis. For example, when the transparency of the transparent display 360a is adjusted to allow passage of infrared light, infrared light may reach the sensor unit 310. On the other hand, when the transparency of the transparent display 360a is adjusted to prevent passage of infrared light, infrared light may not reach the sensor unit 310.

In this way, as the introduction amount of infrared light varies, the sensor unit 310 senses variation in the amount of infrared light and generates an electric signal. The controller 180 may determine that the human body 20 is present in the indoor space 500 upon receiving the electric signal generated by the sensor unit 310.

In addition, when the drive unit 355 adjusts the transparency of the transparent display 360a so as to gradually vary according to the lapse of time under control of the controller 180, infrared light, emitted from the human body 20 located in the indoor space 500 of the vehicle 10, varies in amount to be introduced to the sensor unit 310, and the sensor unit 310 senses variation in the amount of infrared light and generates an electric signal. The controller 180 may receive an electric signal generated from the sensor unit 310 and determine that the human body 20 is present in the indoor space 500.

In another alternative implementation of the above-described implementation, instead of the transparent display 360a, a light shield sheet in the form of a shutter may be used as the blocking unit 350. The light shield sheet may be a flat sheet capable of shielding infrared light. The controller 180 controls the drive unit 355. The drive unit 355 varies the introduction amount of infrared light to the sensor unit 310 by opening or closing the light shield sheet in the form of a shutter under control of the controller 180 and the sensor unit 310 senses variation in the amount of infrared light and generates an electric signal. The controller 180 may determine that the human body 20 is present in the indoor space 500 upon receiving the electric signal generated from the sensor unit 310.

Figure 7:
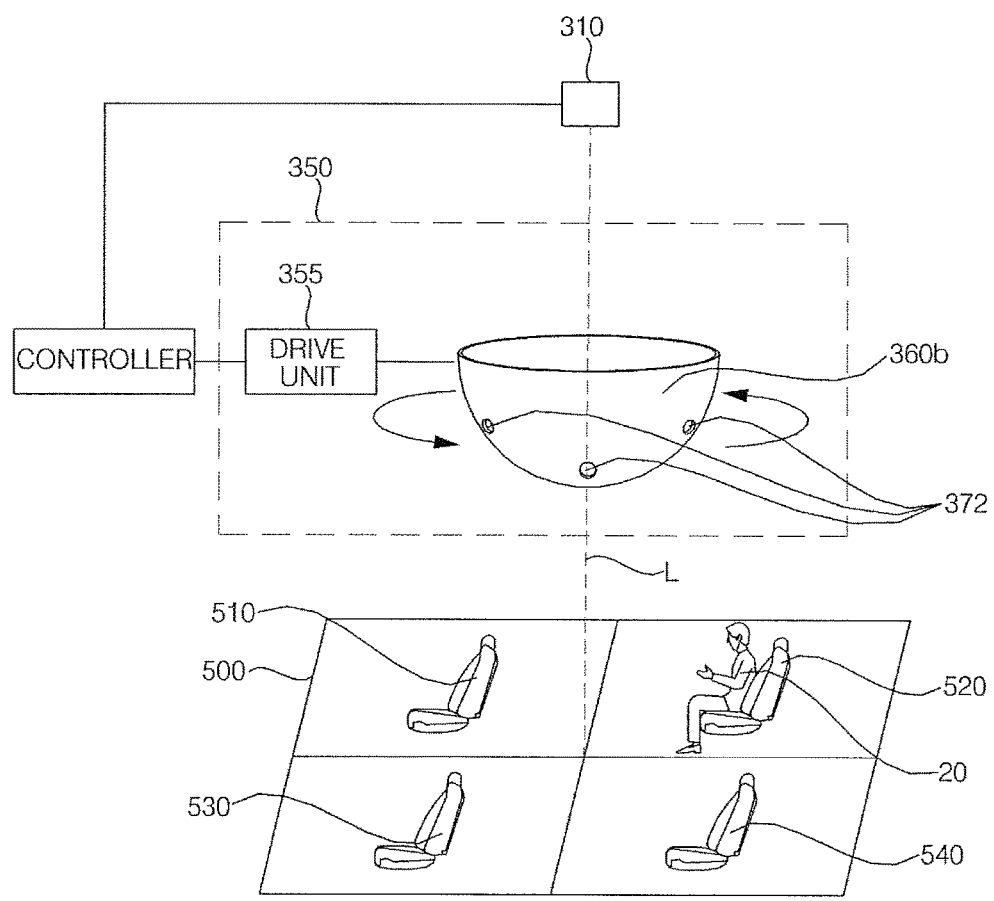
FIG. 7 is a diagram illustrating an example of a blocking unit of a vehicle that includes a semispherical structure.

FIG. 7 is a diagram illustrating an example of a blocking unit of a vehicle that includes a semispherical structure according to some implementations.

Referring to the example of FIG. 7, the controller 180 controls the drive unit 355. Here, the drive unit 355 may include a motor (not illustrated) and a drive power transmitter (not illustrated) to transmit drive power to the blocking device 360. The controller 180 may control the drive unit 355 so as to move the blocking device 360. For example, the controller 180 may control the drive unit 355 so as to rotate the blocking device 360 clockwise or counterclockwise on the basis of a virtual line L that connects the sensor unit 310 to the center of the blocking device 360.

The sensor unit 310 may be oriented in an appropriate direction to sense infrared light emitted from the human body located in the indoor space 500 of the vehicle 10. For example, when the sensor unit 310 is located at the ceiling of the indoor space 500 of the vehicle 10, a pyroelectric element included in the sensor unit 310 may be oriented to face the ground.

The blocking device 360 includes a semispherical structure 360b having at least one hole 372.

The indoor space 500 of the vehicle 10 may be divided into the A area 510, the B area 520, the C area 530 and the D area 540. The semispherical structure 360b may be divided into a plurality of regions (not illustrated) by, for example, partitions (not illustrated) such that infrared light emitted from the human body located in each of the A area 510, the B area 520, the C area 530 and the D area 540 of the indoor space 500 of the vehicle 10 is introduced to the sensor unit 310 through a corresponding one of the regions of the semispherical structure 360b. For example, a virtual line that connects the human body 20 located in the A area 510 of the indoor space 500 to the sensor unit 310 passes through only one of the regions of the semispherical structure 360b corresponding to the A area 510. A virtual line that connects the human body 20 located in the B area 520 of the indoor space 500 to the sensor unit 310 passes through only one of the regions of the semispherical structure 360b corresponding to the B area 512. A virtual line that connects the human body 20 located in the C area 530 of the indoor space 500 to the sensor unit 310 passes through only one of the regions of the semispherical structure 360b corresponding to the C area 530. A virtual line that connects the human body 20 located in the D area 540 of the indoor space 500 to the sensor unit 310 passes through only one of the regions of the semispherical structure 360b corresponding to the D area 540.

It is assumed that the stationary human body 20 is located in the B area 520 of the indoor space 500. At this time, the drive unit 355 may move the semispherical structure 360b under control of the controller 180. In this case, infrared light emitted from the human body 20 may reach or not reach the sensor unit 310 on a per time basis. For example, when the hole 372 is located on a virtual connection line between the human body 20 and the sensor unit 310 via movement of the semispherical structure 360b, infrared light may reach the sensor unit 310 by passing through a corresponding region among the divided regions of the semispherical structure 360b. On the other hand, when the hole 372 is not located on the virtual connection line between the human body 20 and the sensor unit 310 via movement of the semispherical structure 360b, infrared light may not pass through a corresponding region among the divided regions of the semispherical structure 360b and thus may not reach the sensor unit 310.

In this way, as the introduction amount of infrared light varies, the sensor unit 310 senses variation in the amount of infrared light and generates an electric signal. The controller 180 may determine that the human body 20 is present in the indoor space 500 upon receiving the electric signal generated by the sensor unit 310.

Figure 8:
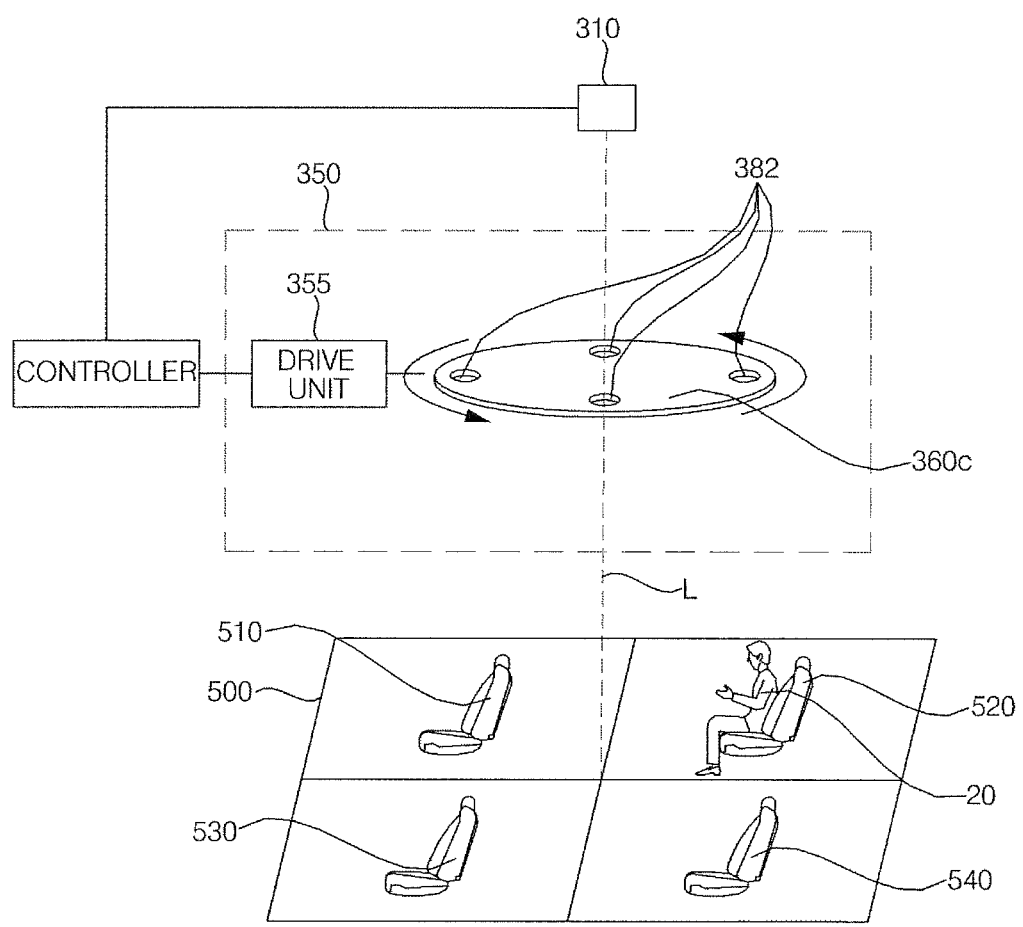
FIG. 8 is a diagram illustrating an example of a blocking unit of a vehicle that includes a circular structure.

FIG. 8 is a diagram illustrating an example of a blocking unit of a vehicle that includes a circular structure according to some implementations.

Referring to the example of FIG. 8, the controller 180 controls the drive unit 355. Here, the drive unit 355 may include a motor (not illustrated) and a drive power transmitter (not illustrated) to transmit drive power to the blocking device 360. The controller 180 may control the drive unit 355 so as to move the blocking device 360. For example, the controller 180 may control the drive unit 355 so as to rotate the blocking device 360 clockwise or counterclockwise on the basis of a virtual line L that connects the sensor unit 310 to the center of the blocking device 360.

The sensor unit 310 may be oriented in an appropriate direction to sense infrared light emitted from the human body located in the indoor space 500 of the vehicle 10. For example, when the sensor unit 310 is located at the ceiling of the indoor space 500 of the vehicle 10, a pyroelectric element included in the sensor unit 310 may be oriented to face the ground.

The blocking device 360 includes a circular structure 360c having at least one hole 382.

The indoor space 500 of the vehicle 10 may be divided into the A area 510, the B area 520, the C area 530 and the D area 540. The circular structure 360c may be divided into a plurality of regions (not illustrated) by, for example, partitions (not illustrated) such that infrared light emitted from the human body located in each of the A area 510, the B area 520, the C area 530 and the D area 540 of the indoor space 500 of the vehicle 10 is introduced to the sensor unit 310 through a corresponding one of the regions of the circular structure 360c. For example, a virtual line that connects the human body 20 located in the A area 510 of the indoor space 500 to the sensor unit 310 passes through only one of the regions of the circular structure 360c corresponding to the A area 510. A virtual line that connects the human body 20 located in the B area 520 of the indoor space 500 to the sensor unit 310 passes through only one of the regions of the circular structure 360c corresponding to the B area 512. A virtual line that connects the human body 20 located in the C area 530 of the indoor space 500 to the sensor unit 310 passes through only one of the regions of the circular structure 360c corresponding to the C area 530. A virtual line that connects the human body 20 located in the D area 540 of the indoor space 500 to the sensor unit 310 passes through only one of the regions of the circular structure 360c corresponding to the D area 540.

It is assumed that the stationary human body 20 is located in the B area 520 of the indoor space 500. At this time, the drive unit 355 may move the circular structure 360c under control of the controller 180. In this case, infrared light emitted from the human body 20 may reach or not reach the sensor unit 310 on a per time basis. For example, when the hole 382 is located on a virtual connection line between the human body 20 and the sensor unit 310 via movement of the circular structure 360c, infrared light may reach the sensor unit 310 by passing through a corresponding region among the divided regions of the circular structure 360c. On the other hand, when the hole 382 is not located on a virtual connection line between the human body 20 and the sensor unit 310 via movement of the circular structure 360c, infrared light may not pass through a corresponding region among the divided regions of the circular structure 360c and thus may not reach the sensor unit 310.

In this way, as the introduction amount of infrared light varies, the sensor unit 310 senses variation in the amount of infrared light and generates an electric signal. The controller 180 may determine that the human body 20 is present in the indoor space 500 upon receiving the electric signal generated by the sensor unit 310.

Figure 9:
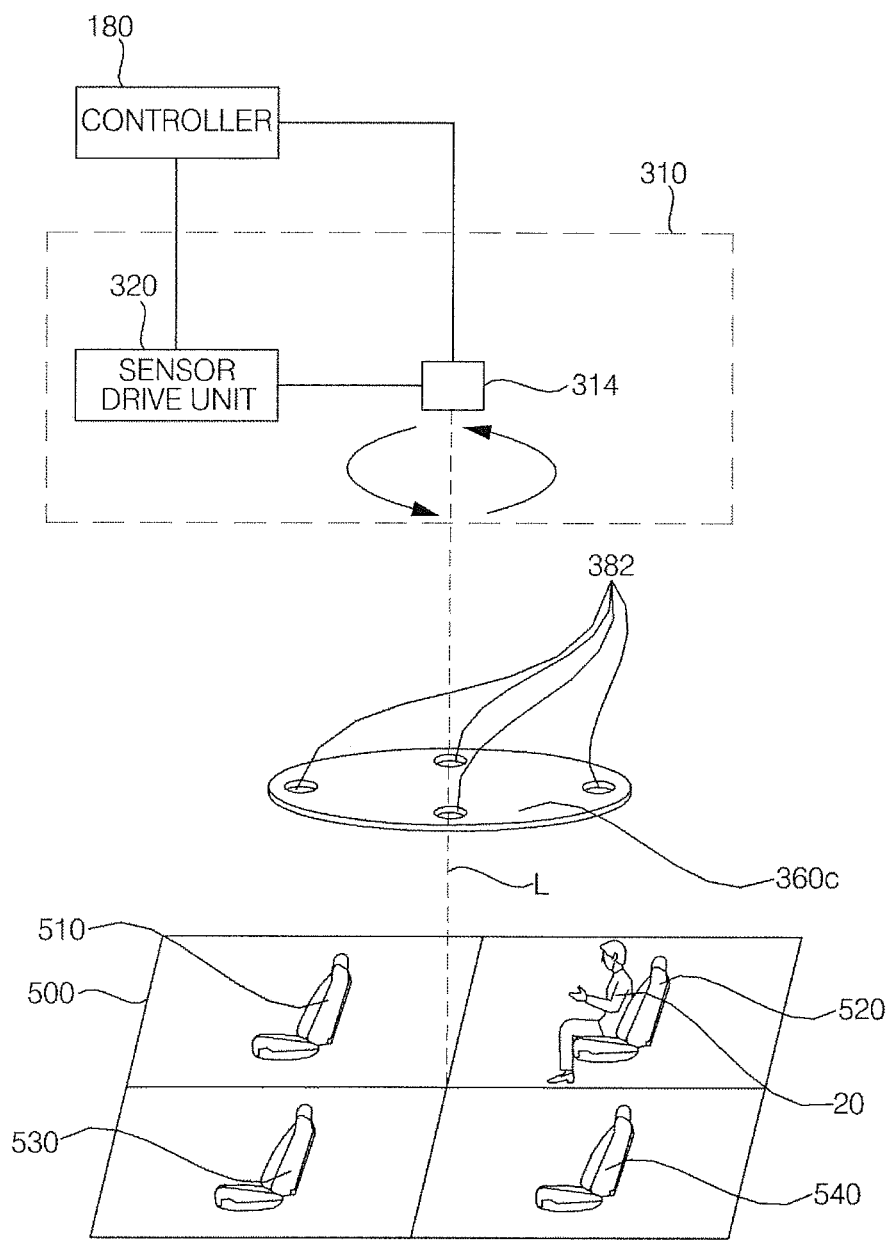
FIG. 9 is a diagram illustrating an example of a sensor unit that is rotated.

FIG. 9 is a diagram illustrating an example of a sensor unit that is rotated according to some implementations.

Referring to the example of FIG. 9, the controller 180 controls the sensor drive unit 320. Here, the sensor drive unit 320 may include a motor (not illustrated) and a drive power transmitter (not illustrated), in order to transmit drive power to the sensor 314. The controller 180 may move the sensor 314 by controlling the sensor drive unit 320. For example, the controller 180 may control the sensor drive unit 320 so as to rotate the sensor 314 clockwise or counterclockwise on the basis of a virtual line L that connects the sensor 314 to the center of the blocking device 360. Here, the blocking device 360 may include the transparent display 360a having a plurality of divided regions or the semispherical or circular structure 360b or 360c having at least one hole 372 or 382 as described above.

The sensor 314 may be oriented in an appropriate direction to sense infrared light emitted from the human body located in the indoor space 500 of the vehicle 10. For example, when the sensor unit 310 is located at the ceiling of the indoor space 500 of the vehicle 10, a pyroelectric element included in the sensor unit 310 may be oriented to face the ground.

The blocking device 360 includes the semispherical or circular structure 360b or 360c having at least one hole 372 or 382.

The indoor space 500 of the vehicle 10 may be divided into the A area 510, the B area 520, the C area 530 and the D area 540.

It is assumed that the stationary human body 20 is located in the B area 520 of the indoor space 500. At this time, the sensor drive unit 320 may move the sensor 314 under control of the controller 180. In this case, infrared light emitted from the human body 20 may reach or not reach the sensor 314 on a per time basis. For example, when the hole 382 is located on a virtual connection line between the human body 20 and the sensor 314 via movement of the sensor 314, infrared light may reach the sensor 314. On the other hand, when the hole 382 is not located on the virtual connection line between the human body 20 and the sensor 314 via movement of the sensor 314, infrared light may not reach the sensor 314.

In this way, as the introduction amount of infrared light varies, the sensor unit 310 senses variation in the amount of infrared light and generates an electric signal. The controller 180 may determine that the human body 20 is present in the indoor space 500 upon receiving the electric signal generated by the sensor unit 310.

Although the respective implementations have described a vehicle having a sensor unit to sense the human body, it can be appreciated that the sensor unit may function to sense a living body.

In addition, in the respective implementations, although the blocking device such as the transparent display 360a, the semispherical structure 360b or the circular structure 360c has been described as including partitions to divide the blocking device into a plurality of independent regions, it can be appreciated that the blocking device may require no partition so long as infrared light emitted from the human body located in any one area among a plurality of areas of the indoor space 500 is introduced to the sensor unit 310 through only one of the regions of the blocking device.

A vehicle and an operating method thereof according to at least one implementation having the above-described configuration may, in some cases, have the following effects.

First, some implementations may reduce the risk of fatal accidents by sensing a dangerous situation in a state where a passenger is located in a vehicle.

Second, some implementations may enable sensing a stationary living body using a low cost PIR sensor.

Third, some implementations may enable increased reliable operation of a sensor unit even in an OFF state of the vehicle as a result of supplying power to each unit using sunlight.

Effects of the implementations described herein are not limited to the aforementioned effects.

The methods, techniques, systems, and apparatuses described herein may be implemented in digital electronic circuitry or computer hardware, for example, by executing instructions stored in tangible computer-readable storage media.

Apparatuses implementing these techniques may include appropriate input and output devices, a computer processor, and/or tangible computer-readable storage media storing instructions for execution by a processor.

A process implementing techniques disclosed herein may be performed by a processor executing instructions stored on a tangible computer-readable storage medium for performing desired functions by operating on input data and generating appropriate output. Suitable processors include, by way of example, both general and special purpose microprocessors. Suitable computer-readable storage devices for storing executable instructions include all forms of nonvolatile memory, including, by way of example, semiconductor memory devices, such as Erasable Programmable Read-Only Memory (EPROM), Electrically Erasable Programmable Read-Only Memory (EEPROM), and flash memory devices; magnetic disks such as fixed, floppy, and removable disks; other magnetic media including tape; and optical media such as Compact Discs (CDs) or Digital Video Disks (DVDs). Any of the foregoing may be supplemented by, or incorporated in, specially designed application-specific integrated circuits (ASICs).

Although the operations of the disclosed techniques may be described herein as being performed in a certain order and/or in certain combinations, in some implementations, individual operations may be rearranged in a different order, combined with other operations described herein, and/or eliminated, and desired results still may be achieved. Similarly, components in the disclosed systems may be combined in a different manner and/or replaced or supplemented by other components and desired results still may be achieved.

What is claimed is:

1. A vehicle comprising:
a sensor unit configured to sense infrared light emitted from one or more areas inside the vehicle;
an alarm unit configured to output an acoustic signal;
a blocking unit located between the sensor unit and the one or more areas inside the vehicle, wherein the blocking unit is configured to vary an amount of infrared light introduced to the sensor; and
a controller configured to:
control at least one of the blocking unit or the sensor unit so as to vary an amount of infrared light that the sensor unit is able to receive through the blocking unit from the one or more areas inside the vehicle; and
determine, based on a variation in the amount of infrared light received by the sensor unit, whether or not a living body is present inside the vehicle,
wherein the controller is further configured to:
determine whether a living body is present in the one or more areas inside the vehicle via the sensor unit; and
control the alarm unit based on a determination of whether a living body is present in the one or more areas inside the vehicle.

2. The vehicle according to claim 1, wherein the controller is further configured to:
control the at least one of the blocking unit or the sensor unit such that the sensor unit is unable to receive infrared light through the blocking unit from the one or more areas inside the vehicle during a first time period; and
control the at least one of the blocking unit or the sensor unit such that the sensor unit is able to receive infrared light through the blocking unit from the one or more areas inside the vehicle during a second time period.

3. The vehicle according to claim 1, wherein the controller is further configured to:
control the at least one of the blocking unit or the sensor unit such that the sensor unit is unable to receive infrared light through the blocking unit from a first area among the one or more areas inside the vehicle; and
control the at least one of the blocking unit or the sensor unit such that the sensor unit is able receive infrared light through the blocking unit from a second area among the one or more areas inside the vehicle.

4. The vehicle according to claim 1, wherein:
the blocking unit includes a transparent display having an adjustable transparency; and
the controller is further configured to control the adjustable transparency of the transparent display of the blocking unit so as to vary an amount of infrared light that can pass through the blocking unit from the one or more areas inside the vehicle to the sensor unit.

5. The vehicle according to claim 4, wherein the controller is further configured to:
control the adjustable transparency of the transparent display so that the sensor unit is unable to receive infrared light through the blocking unit from the one or more areas inside the vehicle; and
control the adjustable transparency of the transparent unit so that the sensor unit is able to receive infrared light through the blocking unit from the one or more areas inside the vehicle.

6. The vehicle according to claim 1, wherein the blocking unit comprises:
a circular or semispherical structure having a hole; and
a drive unit connected to the circular or semispherical structure and configured to provide the circular or semispherical structure with drive power;
the controller is further configured to:
control the drive unit to set a position of the circular or semispherical structure so that the sensor unit is unable to receive infrared light through the blocking unit from the one or more areas inside the vehicle; and
control the drive unit to set a position of the circular or semispherical structure so that the sensor unit is able to receive infrared light through the blocking unit from the one or more areas inside the vehicle.

7. The vehicle according to claim 6, wherein:
the drive unit is configured to provide drive power for a rotation of the circular or semispherical structure; and
the controller is configured to control the drive unit so as to rotate the circular or semispherical structure.

8. The vehicle according to claim 1, wherein the sensor unit includes a passive infrared ray (PIR) sensor.

9. The vehicle according to claim 1, wherein:
the sensor unit comprises:

a sensor configured to sense an amount of infrared light received through the blocking unit from the one or more areas inside the vehicle; and a sensor drive unit configured to provide the sensor with drive power;

the controller is further configured to control the drive unit so as to cause a movement of the sensor that varies the amount of infrared light received by the sensor through the blocking unit from the one or more areas inside the vehicle.

10. The vehicle according to claim 9, wherein:

the sensor drive unit is configured to provide drive power for a rotation of the sensor; and the controller is configured to control the sensor drive unit so as to rotate the sensor.

11. The vehicle according to claim 1, further comprising a power supply unit configured to supply power to the sensor unit by converting sunlight into electric energy.

12. The vehicle according to claim 1, further comprising:

an air conditioner drive unit configured to control an air conditioner of the vehicle so as to supply conditioned air to an interior space of the vehicle;

a window drive unit configured to control an opening and a closing of a window of the vehicle; and a door drive unit configured to control an opening and a closing of a door of the vehicle, wherein the controller is further configured to:

determine whether or not a living body is present in the one or more areas inside the vehicle via the sensor unit; and control at least one of the air conditioner drive unit, the window drive unit, or the door drive unit based on a determination of whether or not a living body is present in the one or more areas inside the vehicle.

13. The vehicle according to claim 1, further comprising a communication unit configured to communicate with an external communication device, wherein the controller is further configured to:

determine whether a living body is present in the one or more areas inside the vehicle via the sensor unit; and control the communication unit based on a determination of whether a living body is present in the one or more areas inside the vehicle.

14. The vehicle according to claim 1, further comprising a parking brake, wherein the controller is further configured to:

determine that the parking brake is engaged; and control an operation of the at least one of the blocking unit or the sensor unit based a determination that the parking brake is engaged.

15. The vehicle according to claim 1, further comprising a temperature sensing unit configured to sense a temperature of an interior space of the vehicle, wherein the controller is further configured to:

determine that the temperature sensed by the temperature sensing unit is greater than or equal to a critical value; and control an operation of the at least one of the blocking unit or the sensor unit based on a determination that the temperature sensed by the temperature sensing unit is greater than or equal to the critical value.

16. The vehicle according to claim 1, further comprising an oxygen amount sensing unit configured to sense an amount of oxygen in an interior space of the vehicle, wherein the controller is further configured to:

determine that an amount of oxygen sensed by the oxygen amount sensing unit is less than or equal to a critical value; and control an operation of the at least one of the blocking unit or the sensor unit based on a determination that the amount of oxygen sensed by the oxygen amount sensing unit is less than or equal to the critical value.

17. The vehicle according to claim 1, further comprising an optical sensor configured to sense sunlight, wherein the controller is further configured to:

determine that a quantity of sunlight sensed by the optical sensor is greater than or equal to a critical value; and control an operation of the at least one of the blocking unit or the sensor unit based on a determination that the quantity of sunlight sensed by the optical sensor is greater than or equal to the critical value.

18. The vehicle according to claim 1, further comprising a starter unit, wherein the controller is further configured to:

determine a time at which the starter unit has turned off;

determine that at least a predetermined period of time has elapsed after the time at which the starter unit is determined to have turned off; and control an operation of the at least one of the blocking unit or the sensor unit based on a determination that at least the predetermined period of time has elapsed after the time at which the starter unit is determined to have turned off.

19. The vehicle of claim 1, wherein the controller is configured to:

determine a first amount of infrared light received by the sensor unit based on controlling the at least one of the blocking unit or the sensor unit so that the sensor unit is unable to receive infrared light through the blocking unit from the one or more areas inside the vehicle;

determine a second amount of infrared light received by the sensor unit based on controlling the at least one of the blocking unit or the sensor unit so that the sensor unit is able to receive infrared light through the blocking unit from the one or more areas inside the vehicle;

compare the first amount of infrared light with the second amount of infrared light;

determine that a difference between the first amount of infrared light and the second amount of infrared light exceeds a threshold; and determine, based on a determination that the difference between the first amount of infrared light and the second amount of infrared light exceeds the threshold, that a living body is present inside the vehicle.

* * * * *